US008122767B2

(12) United States Patent
Dwyer et al.

(10) Patent No.: US 8,122,767 B2
(45) Date of Patent: Feb. 28, 2012

(54) D'ARSONVAL MOVEMENT MEMS ACCELEROMETER

(75) Inventors: Paul W. Dwyer, Seattle, WA (US); Steve Becka, North Bend, WA (US); Matt Reddy, Brier, WA (US)

(73) Assignee: Honeywell International Inc., Morristown, NJ (US)

( * ) Notice: Subject to any disclaimer, the term of this patent is extended or adjusted under 35 U.S.C. 154(b) by 597 days.

(21) Appl. No.: 12/247,937

(22) Filed: Oct. 8, 2008

(65) Prior Publication Data
US 2010/0083761 A1 Apr. 8, 2010

(51) Int. Cl.
G01P 15/08 (2006.01)
(52) U.S. Cl. ...................................... 73/514.31
(58) Field of Classification Search ............... 73/514.31, 73/514.17, 514.18, 514.21, 514.22, 514.23, 73/514.32, 514.36, 514.37
See application file for complete search history.

(56) References Cited

U.S. PATENT DOCUMENTS

| 4,088,027 | A | | 5/1978 | Hernandez et al. | |
|---|---|---|---|---|---|
| 4,144,765 | A | * | 3/1979 | Aske | 73/514.24 |
| 4,498,342 | A | * | 2/1985 | Aske | 73/514.23 |
| 4,510,802 | A | | 4/1985 | Peters | |
| 4,991,438 | A | * | 2/1991 | Evans | 73/514.08 |
| 5,060,039 | A | * | 10/1991 | Weinberg et al. | 73/514.24 |
| 5,600,067 | A | | 2/1997 | Rupnick et al. | |
| 5,731,703 | A | | 3/1998 | Bernstein et al. | |
| 5,739,431 | A | | 4/1998 | Petri | |
| 6,073,490 | A | * | 6/2000 | Konovalov et al. | 73/514.17 |
| 6,664,786 | B2 | | 12/2003 | Kretschmann et al. | |
| 6,776,042 | B2 | * | 8/2004 | Pike et al. | 73/514.32 |
| 7,303,935 | B2 | | 12/2007 | DeNatale et al. | |
| 7,346,981 | B2 | | 3/2008 | Borwick, III et al. | |
| 2005/0268719 | A1 | | 12/2005 | Malametz | |
| 2007/0039388 | A1 | * | 2/2007 | Dwyer et al. | 73/514.31 |
| 2010/0083759 | A1 | * | 4/2010 | Dwyer et al. | 73/514.31 |
| 2010/0083760 | A1 | * | 4/2010 | Dwyer | 73/514.31 |
| 2010/0170341 | A1 | * | 7/2010 | Dwyer et al. | 73/514.31 |
| 2010/0180681 | A1 | * | 7/2010 | Dwyer | 73/514.17 |

* cited by examiner

Primary Examiner — Helen C. Kwok
(74) Attorney, Agent, or Firm — Lowe Graham Jones PLLC

(57) ABSTRACT

Microelectromechanical (MEMS) accelerometer and acceleration sensing methods. A MEMS accelerometer includes a housing, a proof mass suspended within the housing by at least one torsional flexure, and a torsional magnetic rebalancing component. In an example embodiment, the torsional magnetic rebalancing component includes at least one planar coil on the proof mass that extends on both sides of an axis of rotation of the proof mass about the at least one torsional flexure and at least one magnet oriented such that a north-south axis of the at least one magnet is oriented approximately orthogonal to the rotational axis of the proof mass. A method includes sensing a change in capacitance of a pickoff in the MEMS accelerometer and rebalancing the MEMS accelerometer by sending a current through the planar coil.

16 Claims, 4 Drawing Sheets

D'ARSONVAL MOVEMENT MEMS ACCELEROMETER

BACKGROUND OF THE INVENTION

High precision accelerometers that use some form of magnetic rebalancing are typically bulky, expensive, and include a moving area that may not be completely sealed such that particulate contamination occurs when magnets are added to the accelerometer system.

SUMMARY OF THE INVENTION

The present invention includes a microelectromechanical (MEMS) accelerometer and acceleration sensing methods. An example MEMS accelerometer includes a housing, a proof mass suspended within the housing by at least one torsional flexure, and a torsional magnetic rebalancing component.

In accordance with one aspect of the invention, the torsional magnetic rebalancing component includes at least one planar coil on the proof mass that extends on both sides of an axis of rotation of the proof mass about the at least one torsional flexure and at least one magnet oriented such that a north-south axis of the at least one magnet is oriented approximately orthogonal to the rotational axis of the proof mass.

In accordance with still further aspects of the invention, a method includes sensing a change in capacitance of a pickoff in the MEMS accelerometer and rebalancing the MEMS accelerometer by sending a current through the planar coil.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
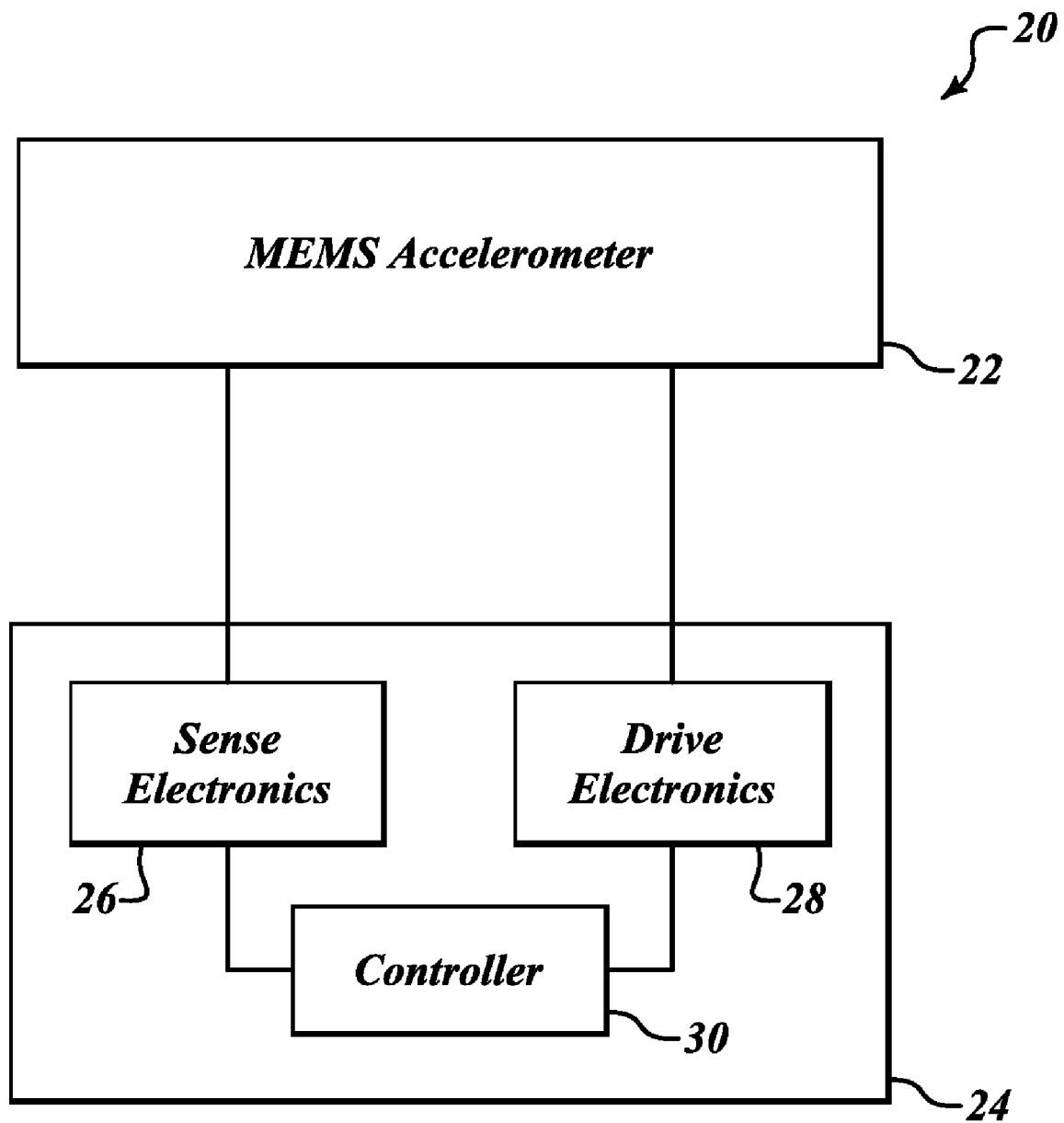
FIG. 1 is a block diagram of a microelectromechanical (MEMS) accelerometer system formed in accordance with an embodiment of the invention.

FIG. 1 is a diagram of a microelectromechanical (MEMS) accelerometer system 20 formed in accordance with an embodiment of the invention. The MEMS accelerometer system 20 includes an accelerometer 22 and a control unit 24. The control unit 24 includes a sense electronics component 26 and a drive electronics component 28, both in signal communication with the MEMS accelerometer 22. The control unit 24 also includes a controller 30 in signal communication with the sense electronics component 26 and the drive electronics component 28. Generally, the accelerometer 22 includes a proof mass suspended by at least one torsional flexure within a housing and a torsional magnetic rebalancing component for rebalancing the proof mass about the at least one torsional flexure. The torsional magnetic rebalancing component makes use of the Lorentz force by passing a current through a coil that lies on both sides of a rotational axis of the proof mass within a magnetic flux field so that D'Arsonval type movement about the rotational axis is used to rebalance the accelerometer 22. A magnetic shield may be present around the accelerometer 22 and/or the accelerometer system 20 in some embodiments for use in a multi-sensor environment. Additional detail for example embodiments of the accelerometer 22 is discussed with respect to FIGS. 2-4.

Figure 2:
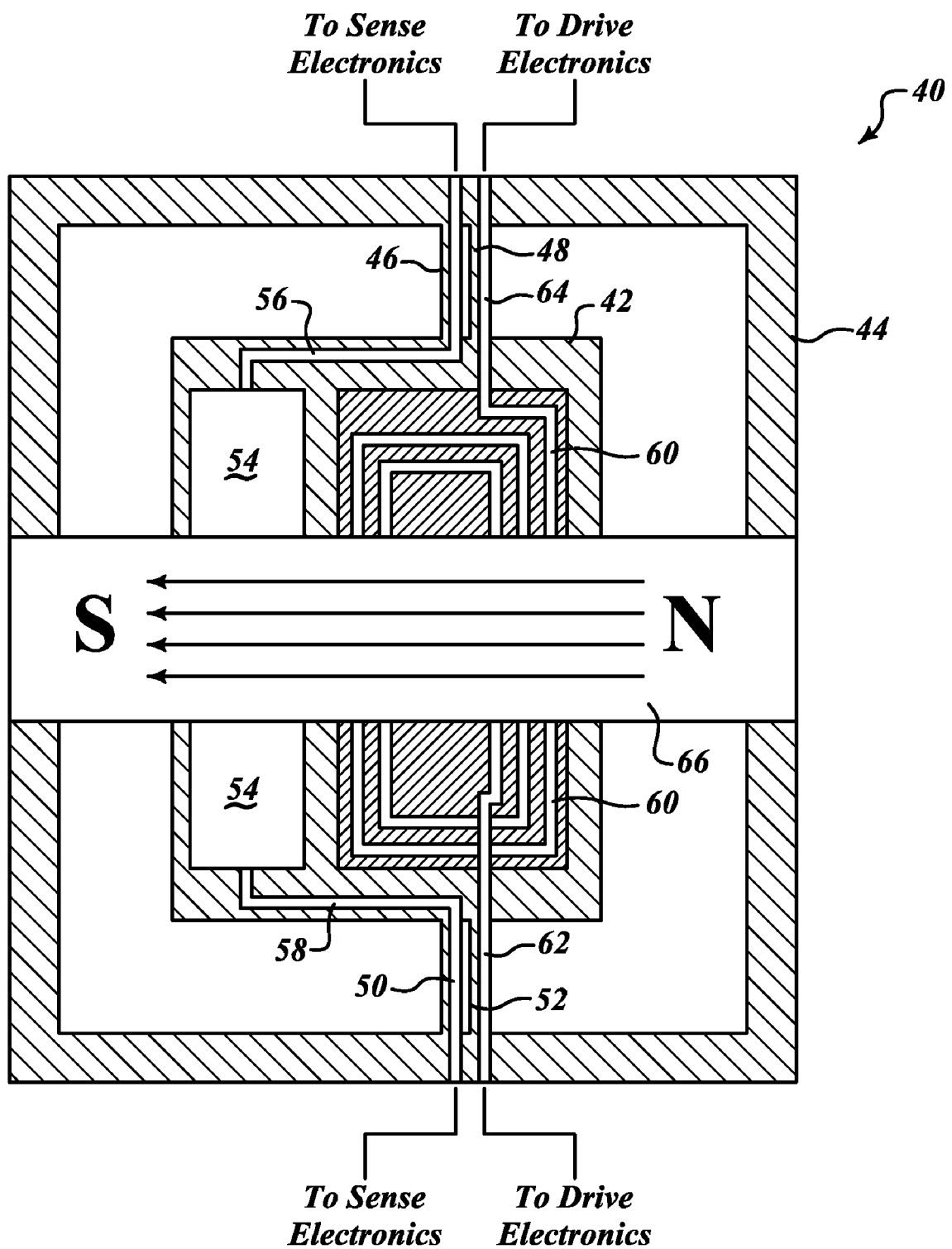
FIG. 2 is a diagram of a top partial x-ray view of a MEMS accelerometer formed in accordance with an embodiment of the invention.

FIG. 2 is a diagram of a top partial x-ray view of a MEMS accelerometer 40 formed in accordance with an embodiment of the invention. The accelerometer 40 may be used in place of the accelerometer 22 in the accelerometer system 20 in some embodiments. The accelerometer 40 includes a proof mass 42 suspended within a housing 44 by a first torsional flexure 46, a second torsional flexure 48, a third torsional flexure 50, and a fourth torsional flexure 52. The torsional flexures 46-52 allow the proof mass 42 to rotate about a rotational axis that is parallel with the flexures 46-52. The proof mass 42 is structured to include a mass imbalance between one side of the rotational axis and the other side of the rotational axis. In the example shown, the rotational axis is positioned such that a greater portion of the proof mass lies to one side of the rotational axis. However, in other embodiments, the mass imbalance may be created in other ways, such as by forming holes or cavities in one side of the proof mass, for example.

A first capacitive pickoff having a first pad 54 is positioned at a first end of a first side of the proof mass 42. A first conductive pickoff trace 56 connects the pad 54 to sense electronics, such as the sense electronics component 26 shown in FIG. 1, over the first torsional flexure 46. A second pad (not shown) for the first capacitive pickoff is attached to an inner surface of a portion (not shown) of the housing 44 that is positioned above the proof mass 42. A second conductive pickoff trace 58 runs across the third torsional flexure 50 to a second capacitive pickoff (not visible behind the first pickoff) on a second side of the proof mass 42. The use of a capacitive pickoff on each side of the same end of the proof mass 42 allows differential measurements to be taken. Additional capacitive pickoffs located on the second side of the proof mass 42, and/or on the other end of the proof mass 42 on the other side of the rotational axis may also be present in some embodiments.

A planar coil 60 is located on the first side of the proof mass 42 and extends on both sides of the rotational axis of the proof mass 42. The coil 60 is a single layer spiral coil in an example embodiment. In an example embodiment, the coil 60 includes approximately 10 turns that are each approximately 45 micrometers (microns) wide, with a spacing of approximately 15 microns between turns and a thickness of approximately 0.5 microns. However, different numbers of turns, widths, spacing, and thicknesses for the coil 60 may also be used. The coil 60 is connected to drive electronics, such as the drive electronics component 28 shown in FIG. 1, by a first conductive coil trace 62 and a second conductive coil trace 64 that run over the second torsional flexure 48 and the fourth torsional flexure 52, respectively. In other example embodiments, the traces that run to the coil 60 are routed over the top and bottom of a single flexure to achieve a common mode effect. This may help to reduce bending effects related to temperature based on differing expansion coefficients for the flexure material and the conductive trace material. Although only a single coil 60 is shown for clarity, additional coils may also be used, such as a second coil located on a second side of the proof mass 42. A magnet 66 is positioned such that a north-south axis of the magnet 66 is oriented approximately orthogonal to the rotational axis of the proof mass. A Samarium Cobalt (SmCo) magnet may be used, for example. Although only a single magnet 66 is shown for clarity, additional magnets may also be used, such as a second magnet located on a second side of the proof mass 42 that is oriented in similar fashion to the magnet 66. Two magnets placed symmetrically on each side of the proof mass 42 may be used to produce an approximately linear magnetic flux field with which current in the coil 60 interacts.

Generally, if positive charges move through a right side of the coil 60 in a direction toward the top of FIG. 2, such as might occur if positive charges enter the coil 60 at the coil trace 62 and leave the coil 60 at the coil trace 64, and a magnetic field is in the direction indicated by the arrows from the N to the S pole of the magnet 66, a force is produced on the right side of the coil 60 that comes out of a plane of the page containing FIG. 2 and a force on the left side of the coil 60 is produced that goes into the plane of the page containing FIG. 2. This creates a torque about the flexures 46, 48, 50, 52. The proof mass 42 is oriented in an asymmetrical manner about the flexures 46, 48, 50, 52. This creates a moment on the proof mass 42 when the accelerometer 40 is subjected to an acceleration that has a component normal to the plane of the proof mass 42. This acceleration is sensed by the sense electronics connected to the capacitive pickoff that includes the pad 54, and an appropriate current is flowed through the coil 60 by the drive electronics to produce a torque that counteracts the moment based on sensed capacitance. The controller 30 may send a drive signal to the drive electronics 28 based on a predetermined calibration and the sensed capacitance, for example. The component of acceleration normal to the plane of the proof mass 42 is determined based on the level of current required to rebalance the proof mass 42.

Figure 3:
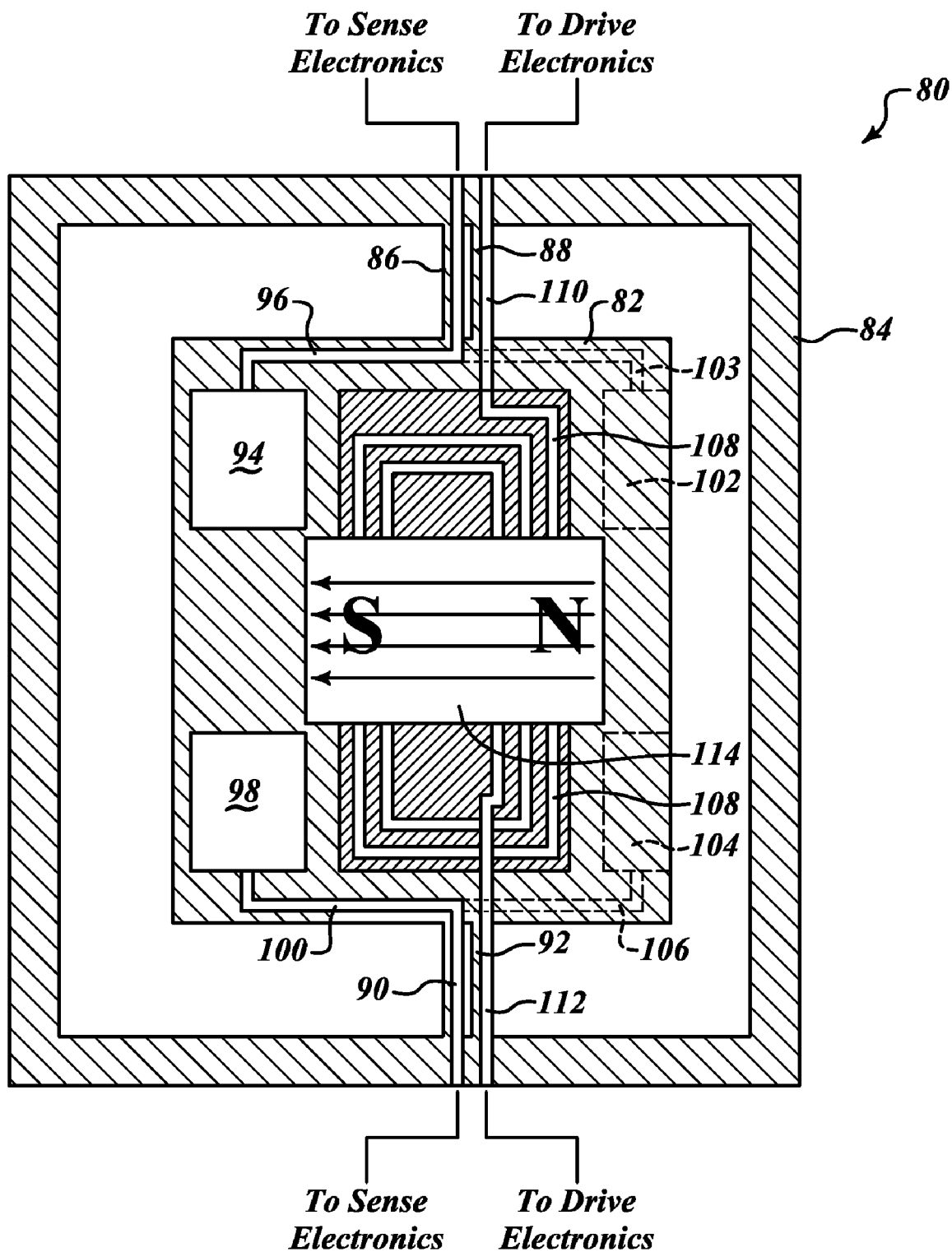
FIG. 3 is a diagram of a top partial x-ray view of a MEMS accelerometer formed in accordance with an additional embodiment of the invention.

FIG. 3 is a diagram of a top partial x-ray view of a MEMS accelerometer 80 formed in accordance with an additional embodiment of the invention. The MEMS accelerometer 80 is similar to the accelerometer 40 shown in FIG. 2, but has additional capacitive pickoffs and also has a shorter magnet. The accelerometer 80 may be used in place of the accelerometer 22 in the accelerometer system 20 in some embodiments. The accelerometer 80 includes a proof mass 82 suspended within a housing 84 by a first torsional flexure 86, a second torsional flexure 88, a third torsional flexure 90, and a fourth torsional flexure 92.

A first capacitive pickoff 94 is positioned at a first end of a first side of the proof mass 82. A first conductive trace 96 connects one pad of the first capacitive pickoff 94 to sense electronics, such as the sense electronics component 26 shown in FIG. 1, over the first torsional flexure 86. Additional traces (not shown) connect a second pad (not shown) of the first pickoff 94 to the sense electronics. A second capacitive pickoff 98 is also positioned at the first end of the first side of the proof mass 82. A second conductive trace 100 connects one pad of the second capacitive pickoff 98 to the sense electronics. A third capacitive pickoff 102 is positioned at a second end of a second side of the proof mass 82. A third conductive trace 103 connects one pad of the third capacitive pickoff 102 to the first conductive trace 96 so that the first and third capacitive pickoffs 94, 102 are electrically connected to each other and the sense electronics. A fourth capacitive pickoff 104 is also positioned at the second end of the second side of the proof mass 82. A fourth conductive trace 106 connects one pad of the fourth capacitive pickoff 104 to the second conductive trace 100 so that the second and fourth capacitive pickoffs 98, 104 are electrically connected to each other and the sense electronics. Connecting pickoffs on opposite sides of the proof mass 82, helps to counteract a proof mass sag effect. By using two pickoffs on each end of each side of the proof mass 82, the sense electronics can drive them with alternating current (AC) signals that are 180 degrees out of phase with each other, such as by driving the first pickoff 94 with a first AC signal having a first phase while driving the second pickoff 98 with a second AC signal having a second phase that is 180 degrees out of phase with the first phase, for example. Driving the first and second pickoffs 94, 98 in this manner may help to counteract cross-axis forces that are unrelated to an acceleration of the accelerometer 80. In an example embodiment, the pickoffs on each end are driven with an AC signal in a range between 20 and 40 kilohertz (kHz), but are 180 degrees out of phase with each other. Although not shown for clarity, additional capacitive pickoffs may be present on the opposite side of the proof mass 82 from each of the four pickoffs 94, 98, 102, 104 that are shown. This allows differential measurements to be taken.

A planar coil 108 is on the proof mass 82, and extends on both sides of the rotational axis of the proof mass 82. The coil 108 is connected to drive electronics, such as the drive electronics component 28 shown in FIG. 1, for example by a first coil trace 110 and a second coil trace 112 that run over the second torsional flexure 88 and the fourth torsional flexure 92, respectively. A magnet 114 is positioned such that such that a north-south axis of the magnet 114 is oriented approximately orthogonal to the rotational axis of the proof mass 82. Although only a single magnet 114 is shown for clarity, additional magnets may also be used, such as a second magnet located on a second side of the proof mass 82 that is oriented in similar fashion to the magnet 114.

Figure 4:
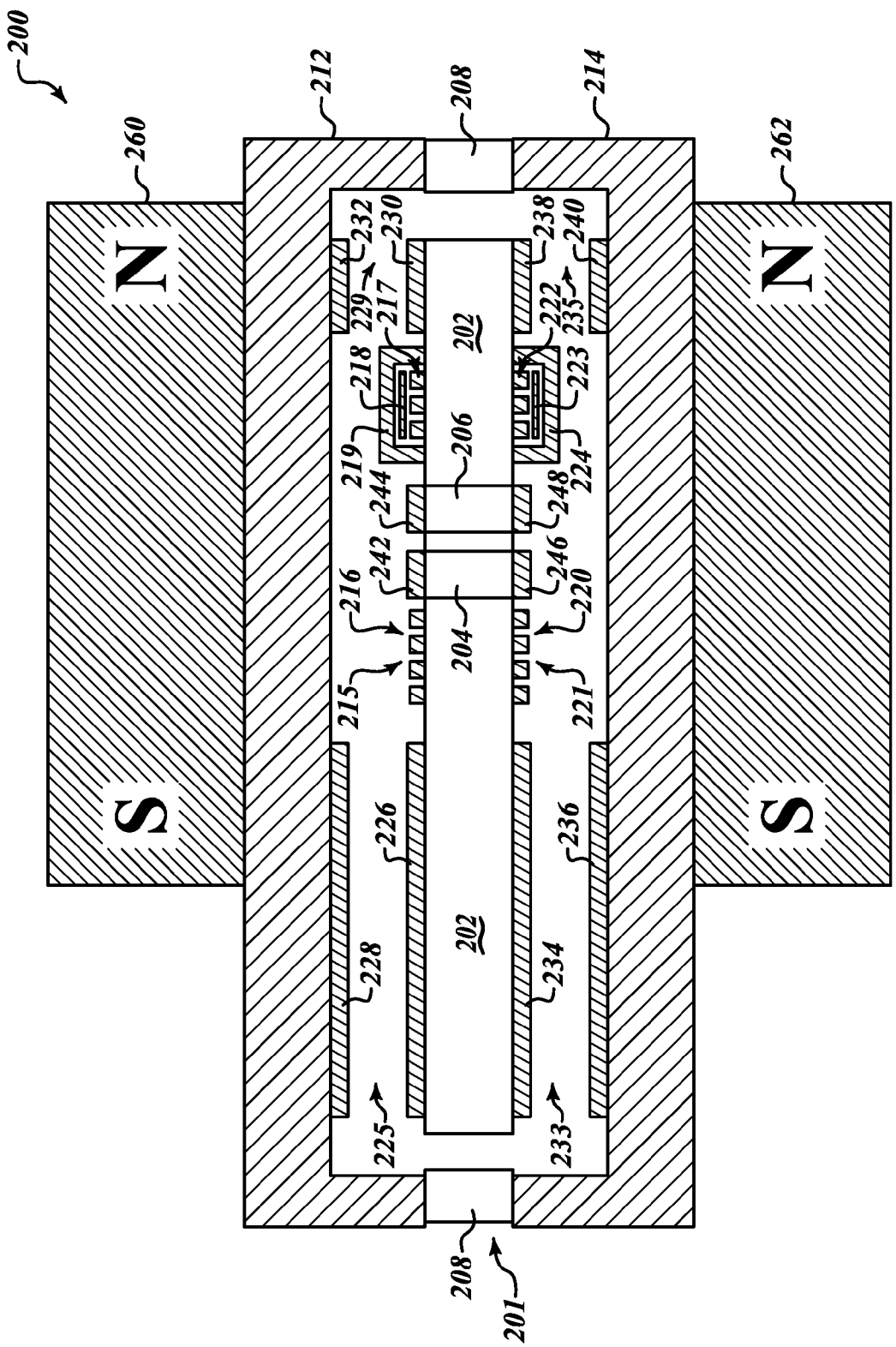
FIG. 4 is a diagram of a cross-sectional side view of a MEMS accelerometer formed in accordance with an example embodiment of the invention.

FIG. 4 is a diagram of a cross-sectional side view of a MEMS accelerometer 200 formed in accordance with an example embodiment of the invention. The MEMS accelerometer 200 is similar to the accelerometers 40 and 80 shown in FIGS. 2 and 3, but also shows second pads of the capacitive pickoffs on an interior of a housing and an additional coil on a second side of the proof mass. The accelerometer 200 may be used in place of the accelerometer 22 in the accelerometer system 20 shown in FIG. 1 in some embodiments.

The accelerometer 200 includes a wafer device layer 201 having a proof mass 202 suspended by a first torsional flexure 204 and a second torsional flexure 206. The wafer device layer 201 includes an outer hoop 208 that is sandwiched between a housing that includes a first housing component 212 and a second housing component 214. The proof mass 202 is suspended within the housing inside the outer hoop 208 by the first and second flexures 204, 206. The first and second torsional flexures 204, 206 connect to another portion (not shown) of the outer hoop 208 in the wafer device layer 201. Additional torsional flexures (not shown) may also be present on another portion (not shown) of the proof mass 202.

A planar first coil 215 is on a first side of the proof mass 202. The first coil 215 extends on a first side 216 and a second side 217 of a rotational axis of the proof mass 202 about the flexures 204, 206. An insulating layer 218 extends across a portion of the first coil 215 so that a conductive trace 219 is able to connect an inner portion of the first coil to external components (not shown), such as the drive electronics 28 shown in FIG. 1, for example. In similar fashion to the first coil 215, a planar second coil 220 is on a second side of the proof mass 202. The second coil 220 extends on a first side 221 and a second side 222 of the rotational axis of the proof mass 202. An insulating layer 223 extends across a portion of the second coil 220 so that a conductive trace 224 is able to connect an inner portion of the second coil 220 to external components (not shown), such as the drive electronics 28.

A first capacitive pickoff 225 is located on a first end of the first side of the proof mass 202. The first capacitive pickoff 225 includes a first pad 226 on the proof mass 202 and a second pad 228 on an inner surface of the first housing component 212 opposite the first pad 226. A second capacitive pickoff 229 is located on a second end of the first side of the proof mass 202. The second capacitive pickoff 229 includes a third pad 230 on the proof mass 202 and a fourth pad 232 on an inner surface of the first housing component 212 opposite the third pad 230. A third capacitive pickoff 233 is located on a first end of the second side of the proof mass 202. The third capacitive pickoff 233 includes a fifth pad 234 on the proof mass 202 and a sixth pad 236 on an inner surface of the second housing component 214 opposite the fifth pad 234. A fourth capacitive pickoff 235 is located on a second end of the second side of the proof mass 202. The fourth capacitive pickoff 235 includes a seventh pad 238 on the proof mass 202 and an eighth pad 240 on an inner surface of the second housing component 214 opposite the seventh pad 238. In an example embodiment, the first and fourth capacitive pickoffs 225, 235 are connected and the second and third capacitive pickoffs 229, 233 are connected to counteract a proof mass sag effect.

A first magnet 260 is positioned such that a north-south axis of the magnet 260 is oriented approximately orthogonal to the rotational axis of the proof mass 202. A second magnet 262 located on the second side of the proof mass 202 is oriented in similar fashion to the magnet 260, with a north-south axis of the magnet 262 oriented approximately orthogonal to the rotational axis of the proof mass 202.

Generally, the accelerometers 22, 40, 80, and 200 are formed by starting with a silicon wafer that is patterned and etched to produce several pendulous proof mass elements with torsional flexures attached to support structures. The wafer is then oxidized to produce a dielectric layer to support metallization. Further patterning and metallization steps create differential capacitive pickoffs and the basic element for a spiral coil. The inner trace of the coil is brought out via the placement of a dielectric layer across the spiral coil, followed by a second metallization step. Glass wafers with the same diameter as the silicon wafer are patterned, etched, and metallized to produce recesses in the surface that act as second plates of the differential capacitive pickoffs and further serve to control device damping. A first glass wafer is then aligned with the silicon wafer and anodically bonded to form the lower capacitor plates. This assembly is then anodically bonded to a second glass wafer to form the upper capacitors for the differential capacitive pickoff. Magnets are attached to the upper and lower glass plates to create a magnetic field with which the spiral coil interacts. The wafer assembly is then diced so that individual accelerometers can be accessed for packaging, testing, and incorporation into an accelerometer system.

In an example embodiment, the accelerometers 22, 40, 80, and 200 of FIGS. 1-4 are formed by oxidizing a pattern and deep reactive ion etching (DRIE) a proof mass and torsional flexures on a silicon wafer. Next, a spiral coil and pickoffs are metallized on the proof mass. The spiral coil and pickoffs may be formed of gold, for example. Then, an insulating layer is sputtered across a portion of the coils. Next, an additional trace is metallized across the insulating layer to bring a connection to an inner part of the coils. Then, a first housing portion that may be made of a glass such as borosilicate Pyrex, for example, is etched to produce recesses for capacitors and through holes for access to traces on the proof mass. Then, the first housing portion is metallized to form a portion of the capacitive pickoffs. In similar fashion, a second housing portion is etched and metallized. The first and second housing portions are attached to the wafer layer that includes the proof mass, such as by anodically bonding the housing portions to the wafer layer. Then, magnets are mounted to the first and second portions of the housing on either side of the proof mass. Mounting the magnets after the first and second housing components have been attached to the wafer device layer seals the device from particulate contamination that could otherwise occur during attachment of the magnets.

While the preferred embodiment of the invention has been illustrated and described, as noted above, many changes can be made without departing from the spirit and scope of the invention. For example, different numbers of flexures may be used and/or other types of materials and/or fabrication processes may be employed. A torquer that includes the coil and flexures may be made out of a conductive epitaxial layer (EPI) so that current to drive the torquer is equally distributed across the flexures, while pickoff traces that use less current are routed on a metal on oxide layer over the flexures. Alternatively, the proof mass may be made of EPI. With an EPI proof mass, the surface would be oxidized and the coils would be formed on top of the oxide layer. The oxide would be stripped from one or more pad areas to expose a pickoff ground reference that would be placed across from corresponding metallized glass capacitor plates within the housing. Additionally, other magnet configurations may also be used, such as a plurality of magnets embedded in the proof mass rather than magnets located outside the housing. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A microelectromechanical (MEMS) accelerometer comprising:
   a housing;
   a proof mass suspended within the housing by at least one torsional flexure; and
   a torsional magnetic rebalancing component, the torsional magnetic rebalancing component comprises:
      at least one coil on the proof mass; and
      at least one magnet,
   wherein the at least one coil is a planar coil,
   wherein the proof mass is configured to rotate about the at least one torsional flexure.

2. The MEMS accelerometer of claim 1, wherein the at least one coil comprises:
   a first coil on a first surface of the proof mass; and
   a second coil on a second surface of the proof mass,
   wherein the first and second surfaces are not the same.

3. The MEMS accelerometer of claim 2, wherein the first coil is planar and the second coil is planar.

4. The MEMS accelerometer of claim 2, wherein the at least one magnet comprises:
   a first magnet positioned near the first surface of the proof mass; and
   a second magnet positioned near the second surface of the proof mass.

5. The MEMS accelerometer of claim 4, wherein the first and second magnets are located outside the housing.

6. The MEMS accelerometer of claim 5, wherein a north-south axis of the first magnet and a north-south axis of the second magnet are oriented approximately orthogonal to a rotational axis of the proof mass about the at least one torsional flexure.

7. The MEMS accelerometer of claim 1, further comprising:
   a first capacitive pickoff located at a first end of the proof mass on a first side of the proof mass; and a second capacitive pickoff located at a second end of the proof mass on a second side of the proof mass,
wherein the at least one torsional flexure is between the first capacitive pickoff and the second capacitive pickoff.

8. The MEMS accelerometer of claim 7, wherein the first pickoff and the second pickoff are electrically connected.

9. The MEMS accelerometer of claim 7, further comprising:
a third capacitive pickoff located on the first side of the proof mass on the same side of the at least one torsional flexure as the first pickoff; and
a fourth capacitive pickoff located on the second side of the proof mass on the same side of the at least one torsional flexure as the second pickoff.

10. The MEMS accelerometer of claim 9, wherein the first pickoff and the second pickoff are electrically connected, and wherein the third pickoff and the fourth pickoff are electrically connected.

11. The MEMS accelerometer of claim 1, wherein the at least one magnet is a Samarium Cobalt (SmCo) magnet.

12. The MEMS accelerometer of claim 1, further comprising:
at least one pickoff having a first side located on the proof mass and a second side located on an interior portion of the housing;
a sense electronics component in signal communication with the at least one pickoff, the sense electronics component configured to generate at least one sense signal based on at least one capacitance value of the at least one pickoff;
a drive electronics component in signal communication with the at least one coil; and
a controller in signal communication with the sense electronics component and the drive electronics component,
wherein the controller is configured to direct the drive electronics component to send a current through the at least one coil based on the at least one sense signal and wherein the controller is further configured to provide an output signal indicative of an acceleration experienced by the accelerometer, the output based on at least one of the current and the at least one sense signal.

13. A method of sensing acceleration with a MEMS accelerometer that includes a proof mass having an axis of rotation about at least one flexure and at least one magnet positioned such that a magnetic flux field flows approximately orthogonally to the axis of rotation, the method comprising:
sensing a change in capacitance of a pickoff in the MEMS accelerometer; and
rebalancing the MEMS accelerometer by sending a current through a planar coil positioned on the proof mass such that the coil extends on both sides of the axis of rotation of the proof mass through the magnetic flux field.

14. The method of claim 13, wherein rebalancing includes sending a current through a first planar coil on a first side of the proof mass and through a second planar coil on a second side of the proof mass.

15. The method of claim 13, wherein sensing a change in capacitance of a pickoff in the MEMS accelerometer includes sensing a change in capacitance of a first pickoff.

16. A microelectromechanical (MEMS) accelerometer comprising:
a housing;
a proof mass suspended within the housing by at least one torsional flexure; and
a torsional magnetic rebalancing component comprising:
a first planar coil on a first side of the proof mass;
a second planar coil on a second side of the proof mass;
a first magnet disposed near a first side of the proof mass; and
a second magnet disposed near a second side of the proof mass,
wherein a north-south axis of the first magnet and a north-south axis of the second magnet are oriented approximately orthogonal to a rotational axis of the proof mass about the at least one torsional flexure.

* * * * *